Patented Nov. 4, 1947

2,430,051

UNITED STATES PATENT OFFICE 2,430,051

SOLUBLE SULFANILAMIDE DERIVATIVES AND PROCESS OF PREPARING THEM

Moses Wolf Goldberg, Montclair, N. J., and Stephen Dannie Heineman, New York, N. Y., assignors to Hoffmann-La Roche, Inc., Nutley, N. J., a corporation of New Jersey No Drawing. Application August 16, 1944, Serial No. 549,796

9 Claims. (Cl. 260—239.6)

Our invention relates to new water-soluble sulfanilamide derivatives which are characterized by the presence of a heterocyclic ring in position $N^1$ of the sulfanilamide molecule and of an aliphatic acyl rest substituted by a quaternary nitrogen group in position $N^4$, and which are illustrated by the general formula

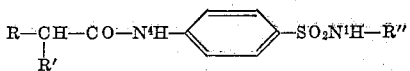

wherein R stands for hydrogen or alkyl, R' for a quaternary nitrogen radical and R'' for a heterocyclic ring.

These compounds form a new group of intestinal antiseptics. Practically all of them were found to have a very pronounced action against the intestinal bacterial flora, being superior in this respect to the known sulfanilamide derivatives. The new compounds are highly soluble in water. In spite of their solubility we found, however, to our surprise, that they are only very slowly and incompletely resorbed from the intestinal tract, and that only very low blood levels are therefore observed after their oral administration. These are very desirable properties for compounds which are to be used as intestinal antiseptics, since in consequence of the incomplete resorption the occurrence of renal complications, so common with the known sulfanilamide derivatives, is avoided. The new compounds represent, therefore, a group of useful intestinal antiseptics of low oral toxicity.

Starting materials for the preparation of the new compounds are the $N^4$-halogeno-acyl derivatives of sulfa-compounds containing in position $N^1$ of the sulfanilamide molecule a heterocyclic ring, as for example, 2-$N^4$-chloro-acetyl-sulfanilamido-pyrimidine, 2-$N^4$-α-chloro-propionyl-sulfanilamido-pyrimidine, 2-$N^4$-α-bromo-propionyl-sulfanilamido-pyrimidine, 2-$N^4$-chloro-acetyl-sulfanilamido-thiazole, 2-$N^4$-α-bromo-propionyl-sulfanilamido-thiazole, 2-$N^4$-chloro-acetyl-sulfanilamido-pyridine, and similar compounds. Instead of the $N^4$-halogeno-acyl derivatives of sulfa-compounds the similarly reacting sulfites, sulfates, alkyl-sulfonates, or aryl-sulfonates of the corresponding $N^4$-hydroxy-acyl derivatives can also be used. These starting materials are either known compounds, or can easily be obtained, for example, by reacting sulfanilamide derivatives containing a heterocyclic ring in position $N^1$ and a free amino-group in position $N^4$ in the usual manner with anhydrides or acid halogenides of aliphatic halogeno-acids.

When these starting materials are reacted with tertiary amines, for example, with pyridine or trimethyl-amine, the new water-soluble sulfanilamide derivatives, corresponding to the above mentioned general formula, are obtained in good yields. The reactions can be conducted in the cold or at elevated temperatures, and with or without the use of a solvent or diluent. If an aqueous reaction mixture is used, then instead of obtaining directly the water-soluble salts of the new quaternary nitrogen derivatives, the corresponding free bases, or their intramolecular anhydrides, the betaines, are sometimes obtained as intermediates. They can easily be converted into the corresponding soluble salts by treating them with an acid.

Thus, for example, by heating a suspension of 2-$N^4$-α-chloro-propionyl-sulfanilamido-pyrimidine in dry pyridine the chloride of 2-$N^4$-[N-α-pyridinium-propionyl]-sulfanilamido-pyrimidine is formed. This compound has a very low toxicity. The tolerated dose in mice is more than 15 g. per kg. when given orally, and more than 10 g. per kg. when administered subcutaneously. No lethal dose could be reached. When 5 g. per kg. were given orally a blood level of only 0.5–1 mg.% was observed.

When normal mice were kept on a diet containing 1% of this new compound a very substantial decrease in the count of coliforme organisms was observed in the fecal specimens of at least 75% of the treated animals.

The preparation of this new soluble sulfanilamide derivative and of a series of analogous compounds is described in detail in the following examples:

EXAMPLE 1

*Chloride of 2-$N^4$-[N-pyridinium-acetyl]-sulfanilamido-thiazole*

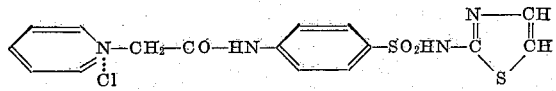

100 cc. dry pyridine are added dropwise with stirring to a refluxing suspension of 33 g. 2-$N^4$-chloro-acetyl-sulfanilamido-thiazole in 300 cc. dry dioxane. The reaction mixture is stirred and refluxed for 6 hours. After a short time, the starting material dissolves, and a dark brown oil is formed on the sides of the flask. After cooling, the solvents are distilled off in vacuo, the dark brown oily residue is dissolved in the smallest possible amount of cold water, and the colored solution is filtered with activated carbon, to remove small traces of insoluble starting material. The aqueous colorless filtrate is concentrated to dryness in vacuo, and the solid residue is purified by dissolving it in boiling aqueous alcohol and precipitating by ether. It melts at 174–178° C. The yield is 10 g.

For analysis, the compound is dried at 100° C. in vacuo to constant weight. It still contains ½ molecule of water of crystallization. The dried product is hygroscopic.

Calc. for $C_{16}H_{15}O_3N_4S_2Cl + ½ H_2O$: C 45.76, H 3.84, Cl 8.44%. Found: C 45.67, H 3.72, Cl 8.64%.

EXAMPLE 2

*Chloride of 2-$N^4$-[N-pyridinium-acetyl]-sulfanilamido-pyridine*

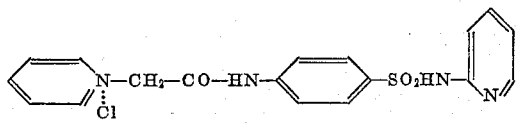

33 g. 2-$N^4$-chloro-acetyl-sulfanilamido-pyridine, 80 cc. absolute pyridine, and 1 liter absolute alcohol are refluxed with stirring for 7½ hours. A clear solution is obtained. The reaction mixture is allowed to stand overnight at room temperature; crystals are formed along the sides of the flask. These are filtered, dissolved in boiling alcohol containing a trace of water, treated with activated carbon and filtered. On cooling to 0° C. the reaction product crystallizes out in shiny plates. It is filtered, washed with alcohol and dried in vacuo. The melting point is unsharp at 165–169° C., as the compound loses water of crystallization (beginning at about 150° C.). The water of crystallization cannot be expelled even on prolonged heating at 100° C. in vacuo. The yield is 20 g.

The analysis of a sample dried to constant weight at 100° C. in vacuo shows that the compound still contains ½ molecule of water of crystallization.

Calc. for $C_{18}H_{17}O_3N_4SCl + ½H_2O$: C 52.23, H 4.38, Cl 8.57%. Found: C 52.22, H 4.40, Cl 8.60%.

EXAMPLE 3

*Chloride of 2-$N^4$-[N-pyridinium-acetyl]-sulfanilamido-pyrimidine*

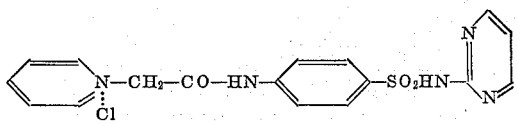

50 cc. dry pyridine are added dropwise within a few minutes to a boiling and stirring suspension of 33 g. 2-$N^4$-chloro-acetyl-sulfanilamido-pyrimidine in 1 liter absolute dioxane. After 5 minutes' refluxing, the solution becomes turbid and crystallization takes place. The reaction mixture is stirred and refluxed for another 6 hours, and is then allowed to stand overnight at room temperature. The solution is filtered, the precipitate is dissolved in water and filtered from small amounts of insoluble material. The water is distilled off in vacuo, and the residue treated several times with alcohol, in order to solidify it. The reaction product is then recrystallized out of warm aqueous alcohol with addition of ether. It melts at 263–265° C. The yield is 21 g. 13 g. unchanged starting material can be recovered from the original dioxane mother liquor.

For analysis the compound was dried to constant weight at 100° C. in vacuo.

Calc. for $C_{17}H_{16}O_3N_5SCl$: C 50.33, H 3.97, Cl 8.75%. Found: C 50.36, H 4.15, Cl 8.48%.

EXAMPLE 4

*Bromide of 2-$N^4$-[N-α-pyridinium-propionyl]-sulfanilamido-thiazole*

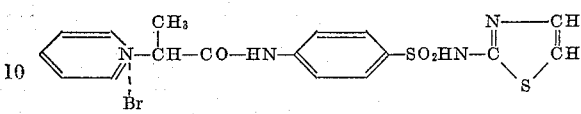

120 cc. dry pyridine are added dropwise to a boiling stirring suspension of 58.5 g. 2-$N^4$-α-bromo-propionyl-sulfanilamido-thiazole in 1500 cc. alcohol. After a short time, the 2-$N^4$-α-bromo-propionyl-sulfanilamido-thiazole dissolves. The reaction mixture is stirred and refluxed for 9 hours. After 6 hours, precipitation of the reaction product begins, and it increases on prolonged heating. After standing overnight at room temperature, the reaction mixture is filtered. The alcohol filtrate is concentrated in vacuo, until no more of the reaction product precipitates. The combined precipitates are dissolved in boiling aqueous alcohol, the solution is treated with activated carbon and filtered. The reaction product crystallizes out on cooling. It is recrystallized three times out of boiling aqueous alcohol, and though previously dried for several hours at 100° C. in vacuo its melting point is still unsharp. The substance contains water of crystallization, which is only expelled at its melting point. It froths at 150° C. and melts at 153–155° C. with decomposition. The yield is 52 g.

For analysis the compound was dried to constant weight at 100° C. in vacuo. It retains one molecule of water.

Calc. for $C_{17}H_{17}O_3N_4S_2Br.H_2O$: C 41.99, H 3.90, Br 16.43%. Found: C 42.28, H 4.12, Br 16.26%.

EXAMPLE 5

*Bromide of 2-$N^4$-[N-α-pyridinium-propionyl]-sulfanilamido-pyrimidine*

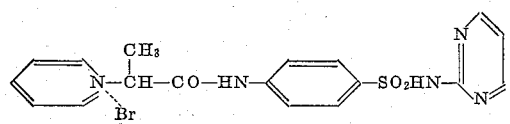

120 cc. absolute pyridine are added dropwise with stirring to a refluxing suspension of 59 g. of 2-$N^4$-α-bromo-propionyl-sulfanilamido-pyrimidine in 1500 cc. absolute alcohol. After 2 hours, the mixture becomes clear. Refluxing is continued for another 5½ hours. The reaction mixture is then allowed to stand overnight at room temperature. After concentrating in vacuo to dryness, the oily residue is treated with water, and a small amount of insoluble starting material is filtered off. The aqueous filtrate is treated with activated carbon, filtered and concentrated to dryness in vacuo. The residue is now dissolved in the smallest possible amount of boiling methanol, again treated with activated carbon, the solution filtered and concentrated a little. After cooling and scratching the reaction product crystallizes out. It melts after two further recrystallizations out of methanol at 167–173° C. The compound is somewhat hygroscopic. Yield 50 g.

For analysis the substance was dried to constant weight at 100° C. in vacuo.

Calc. for $C_{18}H_{18}O_3N_5SBr$: C 46.56, H 3.88, Br 17.24%. Found: C 46.17, H 3.91, Br 17.15%.

EXAMPLE 6

*Chloride of 2-N⁴-[N-α-pyridinium-propionyl]-sulfanilamido-pyrimidine*

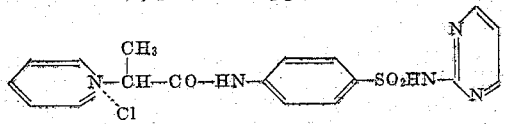

A suspension of 450 g. dry 2-N⁴-α-chloropropionyl-sulfanilamido-pyrimidine in 1300 cc. absolute pyridine is gently refluxed for 3 hours, whereupon the N₄-α-chloro-propionyl-sulfanilamido-pyrimidine dissolves and the solution becomes colored. After 2 hours, precipitation of the reaction product begins. After cooling the reaction mixture to 0° C., the product is filtered and dried as well as possible under suction. It weighs between 450–470 g., and is dissolved in a boiling mixture of 7½ liters alcohol and 650 cc. water. The solution is refluxed for 1 hour with 25 g. of activated carbon, and filtered through a steam cone. On cooling, the reaction product crystallizes out. It sinters at 234° C. and melts at 235–236° C. with decomposition. The yield is about 445 g.

For analysis the substance was dried to constant weight at 100° C. in vacuo.

Calc. for $C_{18}H_{18}O_3N_5SCl$: C 51.50, H 4.29, Cl 8.46%. Found: C 51.20, H 4.45, Cl 8.74%.

EXAMPLE 7

*Chloride of 2-N⁴-[trimethyl-ammonium-acetyl]-sulfanilamido-thiazole*

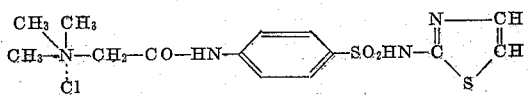

33 g. 2-N⁴-chloro-acetyl-sulfanilamido-thiazole are suspended in 300 cc. water and 150 cc. of a 20% aqueous trimethyl-amine solution. After a few minutes' shaking, everything dissolves, and then a reaction product precipitates out. After standing another hour at room temperature, the product is filtered off, and washed with ice water, alcohol and ether. The reaction product is a basic substance soluble in acids. A sample dried 2 weeks at room temperature in vacuo over phosphorus pentoxide and potassium hydroxide gave the following analytical results: C=46.64; H=5.11; N=15.39%. The figures indicate that the basic substance probably represents a mixture of the quaternary ammonium base corresponding to the chloride of the formula given above, and a substance of betaine nature, formed from this ammonium base by loss of 1 molecule of water.

By adding dilute hydrochloric acid to a suspension of the base in alcohol, until it has dissolved, and then adding ether, the chloride of 2-N⁴-[trimethyl-ammonium-acetyl]-sulfanilamido-thiazole is obtained. It melts at 225–228° C. with decomposition.

For analysis the chloride was dried to constant weight at 100° C. in vacuo.

Calc. for $C_{14}H_{19}O_3N_4S_2Cl$: C 43.02, H 4.86, Cl 9.09%. Found: C 43.30, H 5.12, Cl 9.12%.

EXAMPLE 8

*Chloride of 2-N⁴-[trimethyl-ammonium-acetyl]-sulfanilamido-pyridine*

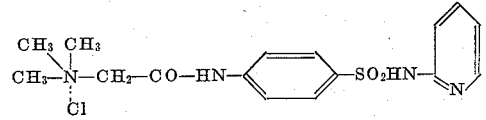

A suspension of 33 g. 2-N⁴-chloro-acetyl-sulfanilamido-pyridine in 225 cc. of water and 150 cc. 20% aqueous trimethylamine is slightly warmed in order to dissolve the N⁴-chloro-acetyl-sulfanilamido-pyridine. The reaction mixture is then allowed to stand at room temperature, whereupon a reaction product precipitates. It is filtered, washed with cold water and dried in vacuo at 50–60° C. M. P. 240–241° C. with decomposition. The analysis of the dried product shows that it is the betaine corresponding to the chloride of the formula given above.

Calc. for $C_{16}H_{20}O_3N_4S$: C 55.17, H 5.75%. Found: C 54.85, H 5.59%.

In order to obtain the chloride, the betaine is dissolved in dilute hydrochloric acid. Then alcohol is added, and the solution treated with activated carbon and filtered. The chloride is precipitated by adding ether to the filtrate. It is filtered off, suspended in alcohol and refluxed in order to remove water of crystallization. M. P. 221.5–222° C. with decomposition and sintering. The yield is 25 g.

For analysis the sample was dried to constant weight at 100° C. in vacuo.

Calc. for $C_{16}H_{21}O_3N_4SCl$: C 49.94, H 5.46, Cl 9.22%. Found: C 50.16, H 5.87, Cl 8.99%.

EXAMPLE 9

*Chloride of 2-N⁴-[trimethyl-ammonium-acetyl]-sulfanilamido-pyrimidine*

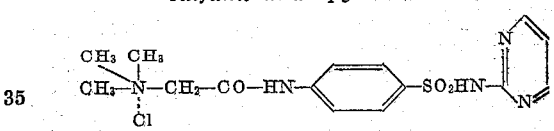

33 g. 2-N⁴-chloro-acetyl-sulfanilamido-pyrimidine are added to a solution of 300 cc. water and 150 cc. 20% aqueous trimethylamine. The N⁴-chloro-acetyl-sulfanilamido-pyrimidine dissolves immediately. After allowing the solution to stand for 4 hours, it is concentrated to dryness in vacuo, and the residue treated several times with alcohol, in order to remove the last traces of water. The solid residue is suspended in alcohol, and dilute hydrochloric acid is added, until a clear solution is obtained. After treating with activated carbon and filtering, the chloride of 2-N⁴-[trimethyl-ammonium-acetyl]-sulfanilamido-pyrimidine crystallizes out on standing. It melts at 238–239° C. with decomposition. The yield is 30 g. The analysis shows that the compound contains ½ mol of water of crystallization, which is not expelled by drying at 100° C. in vacuo.

Calc. for $C_{15}H_{20}O_3N_5SCl + \frac{1}{2}HO$: C 45.62, H 5.36, Cl 8.98%. Found: C 45.82, H 5.08, Cl 9.28%.

EXAMPLE 10

*Bromide of 2-N⁴-[α-trimethyl-ammonium-propionyl]-sulfanilamido-pyrimidine*

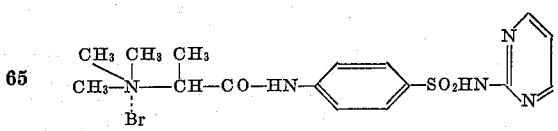

78 g. 2-N⁴-α-bromo-propionyl-sulfanilamido-pyrimidine are suspended in a solution of 600 cc. water and 300 cc. 20% aqueous trimethylamine. The N⁴-α-bromo-propionyl-sulfanilamido-pyrimidine dissolves immediately. After allowing the reaction mixture to stand for 24 hours at room temperature, the solution is concentrated in vacuo to dryness. The residue is mixed several times with absolute alcohol, the alcohol each time being distilled off, in order to remove the last traces of water. The thus treated residue solidifies. It is recrystallized out of boiling aqueous alcohol. On cooling and scratching the bromide crystallizes out in needles. It melts at 214-215° C. with decomposition. The yield is 60 g.

For analysis the compound was dried to constant weight at 100° C. in vacuo.

Calc. for $C_{16}H_{22}O_3N_5SBr$: C 43.24, H 4.95, Br 18.02, N 15.77%. Found: C 43.25, H 5.03, Br. 17.81, N 15.57%.

What we claim is:

1. A sulfanilamide derivative selected from the group consisting of those represented by the following formula

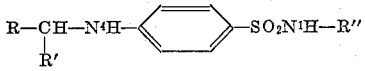

wherein R stands for a radical selected from the group consisting of hydrogen and alkyl, R' is a member selected from the group consisting of pyridinium, trimethylammonium and the halide salts thereof, and R'' is a member selected from the group consisting of pyrimidine, thiazole, and pyridine radicals.

2. $2\text{-}N^4\text{-}[N\text{-}\alpha\text{-pyridiniumbromide-propionyl}]$-sulfanilamido-pyrimidine.

3. $2\text{-}N^4\text{-}[N\text{-}\alpha\text{-pyridiniumchloride-propionyl}]$-sulfanilamido-pyrimidine.

4. $2\text{-}N^4\text{-}[\text{trimethylammoniumchloride-acetyl}]$-sulfanilamido-pyrimidine.

5. Process which comprises reacting a sulfanilamide derivative substituted in position $N^4$ by an aliphatic $\alpha$-halogeno-acyl radical and in position $N^1$ by a member selected from the group consisting of pyrimidine, thiazole and pyridine radicals with a member selected from the group consisting of trimethylamine and pyridine.

6. Process which comprises reacting a sulfanilamide derivative substituted in position $N^4$ by an aliphatic $\alpha$-halogeno-acyl radical and in position $N^1$ by a member selected from the group consisting of pyrimidine, thiazole, and pyridine radicals with a member selected from the group consisting of pyridine and trimethylamine, and isolating the reaction product in one of the forms selected from the group consisting of the free base, the intramolecular anhydride of the base, and its halogeno salts.

7. Process which comprises reacting pyridine with $2\text{-}N^4\text{-}\alpha\text{-bromo-propionyl-sulfanilamido-pyrimidine}$, and isolating the $2\text{-}N^4\text{-}[N\text{-}\alpha\text{-pyridiniumbromide-propionyl}]$-sulfanilamido-pyrimidine.

8. Process which comprises reacting $2\text{-}N^4\text{-}\alpha\text{-chloro-propionyl-sulfanilamido-pyrimidine}$ with pyridine, and isolating the $2\text{-}N^4\text{-}[N\text{-}\alpha\text{-pyridiniumchloride-propionyl}]$-sulfanilamido-pyrimidine.

9. Process which comprises reacting a sulfanilamide derivative substituted in position $N^4$ by an aliphatic $\alpha$-halogeno-acyl radical and in position $N^1$ by a member selected from the group consisting of pyrimidine, thiazole and pyridine radicals with trimethylamine, and isolating the reaction product in one of the forms selected from the group consisting of the free base, the intramolecular anhydride of the base and its trimethylammonium salt.

MOSES WOLF GOLDBERG.
STEPHEN DANNIE HEINEMAN.

REFERENCES CITED

The following references are of record in the file of this patent:

UNITED STATES PATENTS

| Number | Name | Date |
|---|---|---|
| 2,259,222 | Ewins | Oct. 14, 1941 |
| 2,289,029 | Mietzsch et al. | July 7, 1942 |
| 2,359,864 | Linch | Oct. 10, 1944 |
| 2,362,087 | Newberry | Nov. 7, 1944 |

FOREIGN PATENTS

| Number | Country | Date |
|---|---|---|
| 114,821 | Australia | May 21, 1942 |

OTHER REFERENCES

Jour. Amer. Chem. Soc., vol. 62, pages 2002-2005; Aug. 1940.

Certificate of Correction

Patent No. 2,430,051.  November 4, 1947.

MOSES WOLF GOLDBERG ET AL.

It is hereby certified that error appears in the printed specification of the above numbered patent requiring correction as follows: Column 5, line 12, Example 6, for "$N_4$" read $N^4$; and that the said Letters Patent should be read with this correction therein that the same may conform to the record of the case in the Patent Office.

Signed and sealed this 6th day of January, A. D. 1948.

[SEAL]

THOMAS F. MURPHY,
*Assistant Commissioner of Patents.*